(12) United States Patent
Badavne et al.

(10) Patent No.: US 8,914,139 B2
(45) Date of Patent: Dec. 16, 2014

(54) ROBOT

(75) Inventors: Nilay C Badavne, Taipei (TW); Ming-Lu Lai, Taipei (TW); Tai-Ming Parng, Taipei (TW)

(73) Assignee: Asustek Computer Inc., Taipei (TW)

( * ) Notice: Subject to any disclaimer, the term of this patent is extended or adjusted under 35 U.S.C. 154(b) by 303 days.

(21) Appl. No.: 13/465,981

(22) Filed: May 7, 2012

(65) Prior Publication Data

US 2012/0290111 A1 Nov. 15, 2012

(30) Foreign Application Priority Data

May 9, 2011 (TW) .............................. 100116195 A

(51) Int. Cl.
*G06F 17/00* (2006.01)
*G06N 3/00* (2006.01)
*A63H 11/00* (2006.01)
*A63H 3/28* (2006.01)

(52) U.S. Cl.
CPC ............ *G06N 3/008* (2013.01); *A63H 2200/00* (2013.01); *A63H 11/00* (2013.01); *A63H 3/28* (2013.01)
USPC .... 700/94; 180/7.1; 318/568.12; 318/568.18; 320/107; 320/114; 320/162; 369/36.01; 414/280; 455/67.11; 700/213; 700/245; 700/248; 700/255; 700/263; 701/23; 720/654

(58) Field of Classification Search
CPC ....... H04L 45/00; H04L 45/04; H04L 47/122; G06F 9/44505
USPC .................. 180/8.1, 7.1; 318/568.18, 568.12; 455/67.11; 700/94, 213, 245, 248, 263, 700/255; 320/107, 114, 162; 369/36.01; 414/280; 701/23; 720/654
See application file for complete search history.

(56) References Cited

U.S. PATENT DOCUMENTS

| | | | | |
|---|---|---|---|---|
| 4,679,152 | A * | 7/1987 | Perdue ........................... | 701/23 |
| 5,920,678 | A * | 7/1999 | Watanabe et al. ............. | 700/255 |
| 5,959,423 | A * | 9/1999 | Nakanishi et al. ........ | 318/568.12 |
| 6,669,431 | B1 * | 12/2003 | Falace et al. .................. | 414/280 |
| 6,816,753 | B2 * | 11/2004 | Sakamoto et al. ............. | 700/245 |
| 6,868,049 | B2 * | 3/2005 | Ostwald et al. ............ | 369/36.01 |
| 7,042,185 | B2 * | 5/2006 | Yang et al. ............... | 318/568.18 |
| 7,146,622 | B2 * | 12/2006 | Ostwald et al. ............... | 720/654 |
| 7,227,334 | B2 * | 6/2007 | Yang et al. .................... | 320/107 |
| 8,212,533 | B2 * | 7/2012 | Ota ............................... | 320/162 |
| 8,380,348 | B2 * | 2/2013 | Neki et al. ..................... | 700/245 |
| 8,666,546 | B2 * | 3/2014 | Sarh et al. ...................... | 700/248 |
| 2003/0097202 | A1* | 5/2003 | Fujita et al. ................... | 700/245 |
| 2004/0182614 | A1* | 9/2004 | Wakui ............................ | 180/7.1 |

(Continued)

FOREIGN PATENT DOCUMENTS

| | | |
|---|---|---|
| CN | 201327585 Y | 10/2009 |
| JP | 2004355195 A | 12/2004 |
| JP | 2007-110335 A | 4/2007 |
| JP | 2010-012529 A | 1/2010 |
| KR | 20090103078 A | 10/2009 |
| TW | 200928782 A | 7/2009 |
| TW | 200933538 A | 8/2009 |
| TW | 201003582 A | 1/2010 |
| TW | 201024936 A | 7/2010 |
| WO | WO 2005/099359 A2 | 10/2005 |

*Primary Examiner* — Gerald Gauthier
(74) *Attorney, Agent, or Firm* — Muncy, Geissler, Olds & Lowe, P.C.

(57) ABSTRACT

A Robot includes a main body, a Portable device and a supporting structure. The supporting structure is disposed at the main body for detachably connecting the Portable device. The Portable device reads digital media data from the main body or the Portable device itself, and plays the digital media data as video. After the Portable device is detached from the supporting structure, the main body and the Portable device operate independently.

10 Claims, 6 Drawing Sheets

(56) References Cited

U.S. PATENT DOCUMENTS

| | | | |
|---|---|---|---|
| 2005/0231162 A1* | 10/2005 | Takenaka | 320/114 |
| 2005/0234592 A1* | 10/2005 | McGee et al. | 700/245 |
| 2007/0016328 A1* | 1/2007 | Ziegler et al. | 700/245 |
| 2007/0042716 A1* | 2/2007 | Goodall et al. | 455/67.11 |
| 2007/0061040 A1* | 3/2007 | Augenbraun et al. | 700/245 |
| 2007/0061043 A1* | 3/2007 | Ermakov et al. | 700/263 |
| 2007/0073439 A1* | 3/2007 | Habibi et al. | 700/213 |
| 2007/0156286 A1* | 7/2007 | Yamauchi | 700/245 |
| 2007/0192910 A1* | 8/2007 | Vu et al. | 901/17 |
| 2007/0244599 A1* | 10/2007 | Tsai et al. | 700/245 |
| 2008/0133052 A1 | 6/2008 | Jones et al. | |
| 2012/0290111 A1* | 11/2012 | Badavne et al. | 700/94 |

\* cited by examiner

ROBOT

CROSS REFERENCE TO RELATED APPLICATIONS

This application claims the priority benefit of Taiwan application serial no. 100116195, filed on May 9, 2011. The entirety of the above-mentioned patent application is hereby incorporated by reference herein and made a part of specification.

BACKGROUND OF THE INVENTION

1. Field of Invention

The invention relates to a Robot and, more particularly, to a Robot including a Portable device which can operate independently.

2. Related Art

Robots are machines which can imitate actions or thoughts of human beings and other creatures, and they integrate technologies of mechanism, electronic, information and manufacture. The robots are widely used in various fields and particularly used to do works with high risk, high burden, high precision and high repeatability. For example, an industrial robot is used to make products at a production line of the manufacture.

Except for the applications stated above, the robot, such as a cleaning robot, is also used in family or everyday life. Moreover, more and more robots for company or preschool education are launched, and the robots usually have a good looking and interact with users better.

The robots for company or preschool education only can move at one same plane. When the robot is placed at a floor at home, it cannot move onto a chair, a bed or a desk. Thus, when the user sits on a sofa, on a bed, at a desk or goes out, the robot cannot reach to accompany the user, and it is inconvenient for the user to enjoy digital media or application provided by the robot.

On the other hand, a conventional robot does not include a screen to play media, and thus it cannot play the digital media or teaching material vividly. Consequently, the conventional robot cannot play more vivid, variable and lovely contents due to its limitation, and the user also feels limited in interaction.

SUMMARY OF THE INVENTION

A Robot includes a main body, a Portable device and a supporting structure. The supporting structure is disposed at the main body to detachably connect the Portable device. The Portable device at least includes a processing unit, a communication unit. The Portable device transmits data or process commands with the main body, reads the digital media data from the main body or the Portable device itself and plays the digital media data as video or in other forms. Furthermore, the Portable device and the main body can operate independently. For example, when the Portable device is detached from the supporting structure, the main body and the Portable device may operate independently or cooperate with each other.

These and other features, aspects and advantages of the play invention will become better understood with regard to the following description, appended claims, and accompanying drawings.

DETAILED DESCRIPTION OF THE INVENTION

A Robot is illustrated with relating figures, and the same symbols denote the same components.

Figure 1:
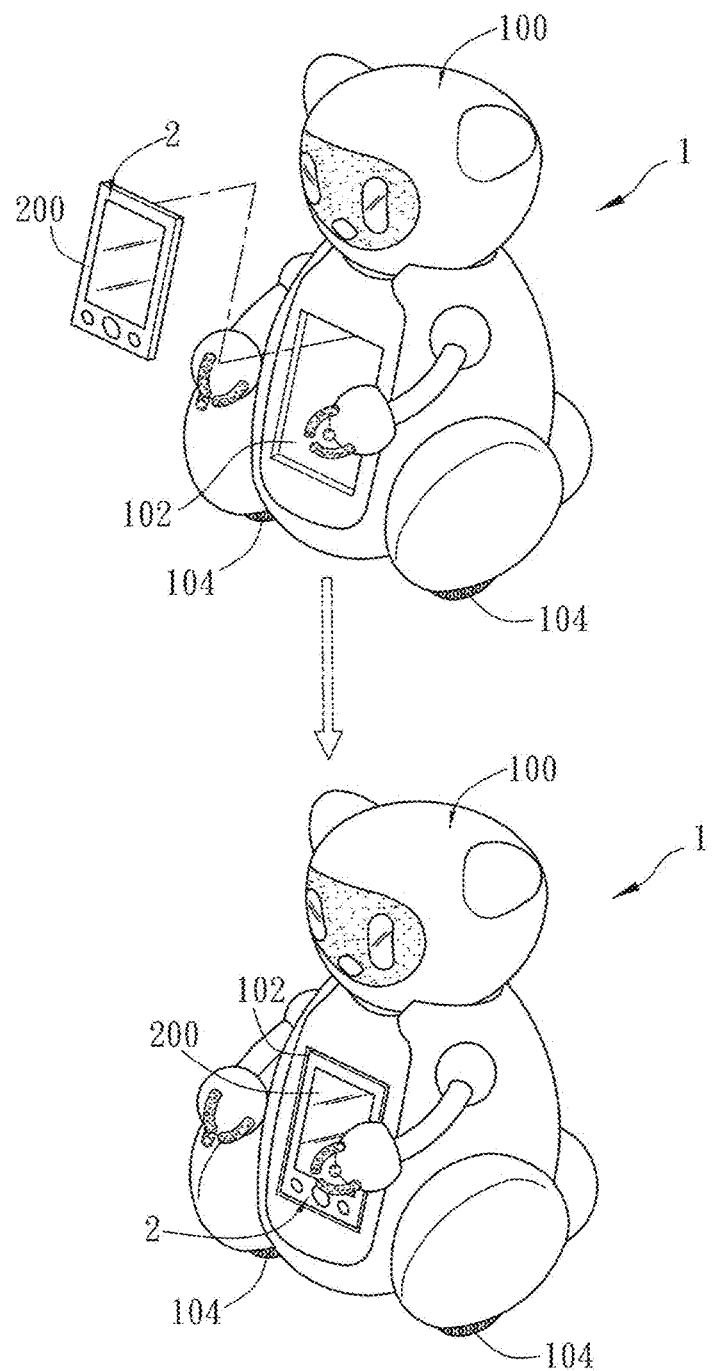
FIG. 1 is a schematic diagram showing a Robot in an embodiment.

FIG. 1 is a schematic diagram showing a Robot 1 including a Portable device 2. The Robot 1 includes a main body 100, a supporting structure 102 and moving components 104. The casing of the main body 100 can imitate appearance of humans or animals. For example, the main body 100 may include components looking like hands, legs and a head. Electronic components can be disposed in the casing to process data and control and drive the main body 100. The supporting structure 102 is disposed at the main body 100 to detachably connect the Portable device 2. The moving components 104 are disposed at two sides or a bottom of the main body 100 to provide a moving function, and the moving components 104 may be wheels.

The supporting structure 102 may be a groove or a base to accommodate the Portable device 2, and the supporting structure 102 can be designed as a part of appearance of the main body 100. For example, the hands or the legs of the main body 100 are used to clamp the Portable device 2.

The Robot 1 can be used to accompany children, the old or pets. The Robot 1 plays the digital media data via a loudspeaker, gestures and a media playing unit of the Portable device, such as playing music, singing nursery rhymes, telling stories, acting body movements and making expressions. Moreover, the Robot 1 can interact with the user. The user can order the Robot 1 to perform various tasks via sound control, gesture control and remote control. The Robot 1 can also display its current state via the media playing unit 200 of the Portable device 2, and express its mood or state to the user via the body movements.

The user disposes the Portable device 2 at the main body 100 via the supporting structure 102, and when the Portable device 2 is disposed at the supporting structure 102, the main body 100 and the media playing unit 200 play the digital media data. When the Portable device 2 is detached from the supporting structure 102, the Portable device 2 and the main body 100 can operate independently. The Portable device 2 may be a mobile phone, a personal digital assistant (PDA) or a PAD device.

The digital media data are stored in a memory unit of the main body 100, and the Portable device 2 can fetch the digital media data via the memory unit of the main body 100 and play contents according the data. Additionally, the memory unit also stores various applications to enable the Robot 1 to provide interaction functions. The digital media data may be teaching material designed specifically for children or according to requirements.

When the Portable device 2 is disposed at the main body 100, the media playing unit 200 can be regarded as a part of the main body 100 and cooperate with the main body 100 to play the digital media data. The Portable device 2 can be used as a control panel of the main body 100. The main body 100 can interact with the user via the media playing unit 200, and can also display the digital media data and the application vividly via the media playing unit 200 and provide interesting touch interaction. When the Robot 1 accompanies the children, it helps the children learn Chinese, math, encyclopedia, music, drawing and puzzles. When the Robot 1 accompanies the old, the media and interaction at the media playing unit 200 entertains the users better. Moreover, the connection of the main body 100 and the media playing unit 200 can also provide a video communication function.

The main body 100 can interact with the user via the media playing unit 200, and when the Portable device 2 is detached from the main body 100, the main body 100 can execute various functions without a display. The main body 100 communicates with the user via voice and visual technology, identifies identity of the user via voice or image and executes relating conversation and chatting. Furthermore, the main body 100 interacts with the user via vivid body movements and expressions. It can tell stories, play nursery rhymes and music, or play easy somatic games with the user. The main body 100 monitors home environment and has a voice call function. The main body 100 can also take pictures and transmit images to the Portable device 2 to monitor the home environment or make video calls.

When the main body 100 and the Portable device 2 are separate, the two devices can operate independently and provide original functions. For example, the Portable device 2 may be a mobile phone, a PDA or a PAD device, and the user can still use it to make a phone call, process data, play video and execute software. The Portable device 2 is not limited to cooperate with the main body 100 and is not limited to provide the digital media data or the application of the main body 100. Furthermore, the Portable device 2 can remotely control the main body 100 via wireless communication.

The Portable device 2 can be used as a display output and a touch control input of the main body 100. Since the Portable device 2 can be detached from the main body 100 for the user to carry, hold or take with, the interaction area between the Robot 1 and the user is not limited to the moving area of the main body 100.

For example, the media playing unit 200 is a touch screen and when the Portable device 2 is disposed at the main body 100, the user controls the main body 100 of the Robot 1 or selects a specific function for the main body 100 to execute via the touch screen. When the Portable device is not disposed at the main body 100, the user still can locally or remotely control the main body 100 or select a specific function for the main body 100 to execute via the touch screen.

The touch screen usually includes an input component and the display component. The input component is a transparent touch control panel coving the display component, and thus the user can watch video displayed at the display component and click or write on the input component via a stylus or a finger.

The media playing unit 200 may only be a display component of the Robot 1. Buttons or the touch control panel of the Portable device 2 can be used as a touch input of the Robot 1.

Figure 2:
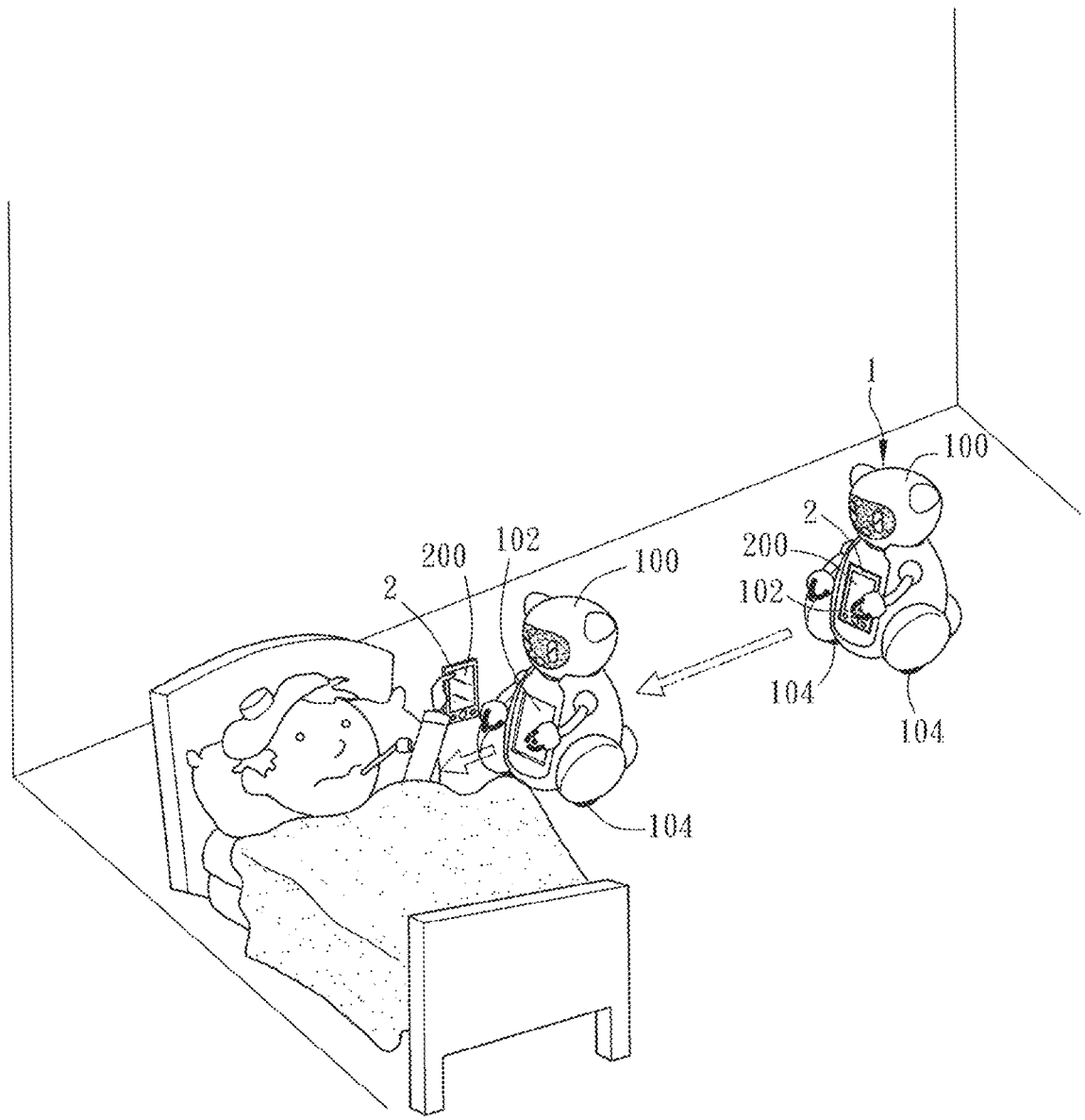
FIG. 2 is a schematic diagram showing a Robot for a user to operate in an embodiment.

As shown in FIG. 2, when the Robot 1 moves on the floor indoors, its moving area is limited by walls, a bed, a desk, a chair and a closet. When the user is at the bed, the Robot 1 can move to the bed to interact with the user. The user can further detach the Portable device 2 from the main body 100 and operate the Portable device 2 to watch the digital contents. Thus, the user can still use the digital media data or the application programs of the main body 100 via the Portable device 2, and the interaction area between the Robot 1 and the user is broadened. The user does not need to be in the same room with the Robot 1, and when the user goes out, he or she can still use the digital media data or the application provided by the main body 100 via the Portable device 2.

Additionally, the Portable device 2 can directly use the built-in digital media data or the application. For example, the Portable device 2 includes the memory unit to store the digital media data, and thus the Portable device 2 can directly fetch the digital media data from the memory unit and display the digital media data at the media playing unit 200. The application of the main body 100 can also be stored in the memory unit of the Portable device 2 for independent use.

The user can operate the Portable device 2 to execute built-in functions, such as browsing data stored in the Portable device 2 or on the website, receiving and sending E-mail, executing instant message software and making phone calls.

When the user is at home, he or she can operate the Portable device 2 to send complicated calculations to the main body 100 for processing or access data from the main body 100 via wireless network. Furthermore, the main body 100 is a node of a wireless local area network (WLAN) and is connected to the network via the WLAN. When the user goes out with the Portable device 2, he or she can monitor the home and take part in a video meeting online by connecting to the main body 100 via the network.

Figure 3:
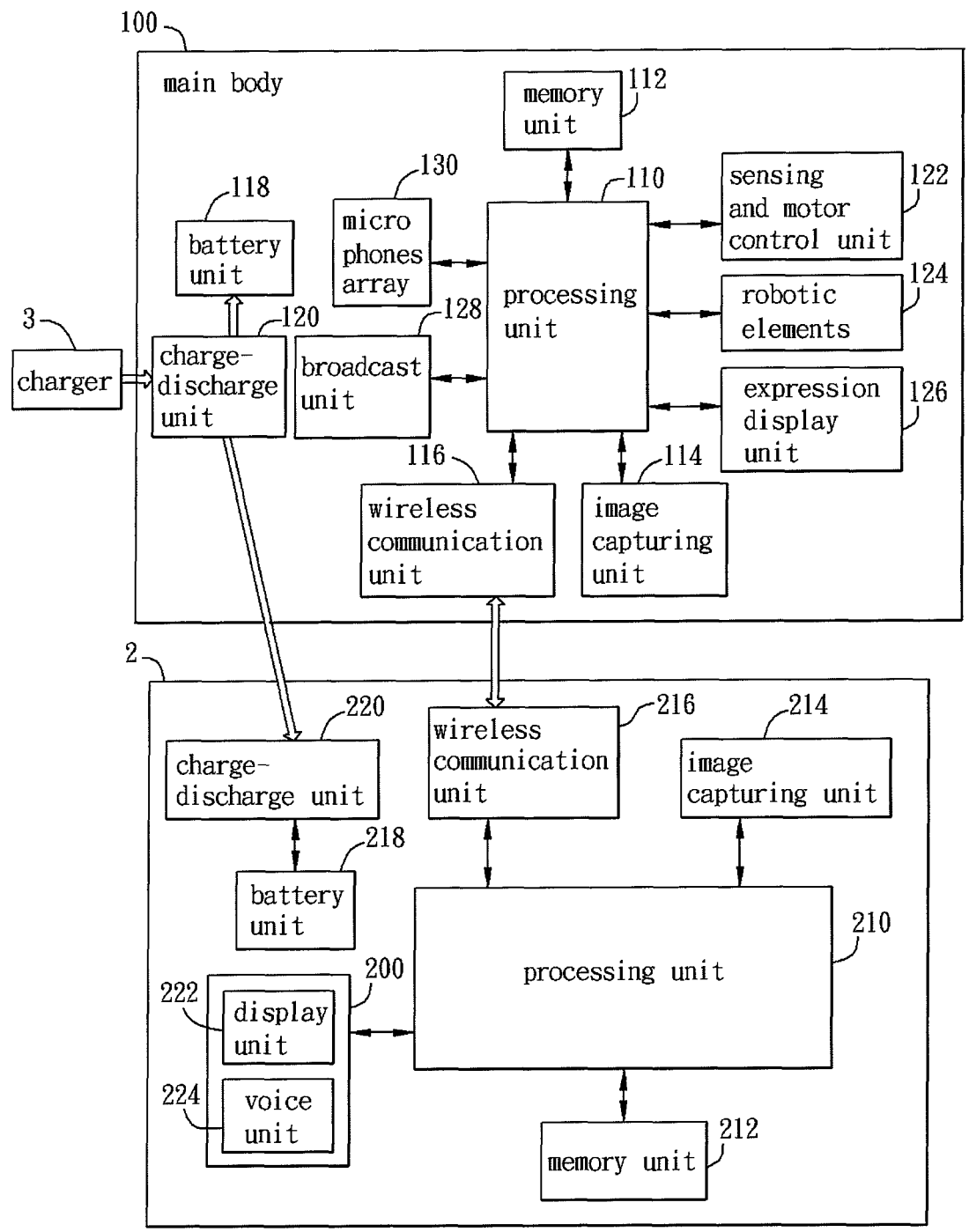
FIG. 3 is a block diagram showing a Robot in an embodiment.

As shown in FIG. 3, the main body 100 includes a processing unit 110, a memory unit 112, an image capturing unit 114, a wireless communication unit 116, a battery unit 118, a charge-discharge unit 120, a sensing and motor control unit 122, robotic elements 124, an expression display unit 126, a broadcast unit 128 and a microphone array 130.

The processing unit 110 includes one or more processors which execute the software modules stored in the memory unit 112 to provide various functions of the main body 100. The processing units also control operation of the main body 100 and generate control data to control relating hardware.

The sensing and motor control unit 122 includes hardware circuits of the motor control and peripheral robotic sensors, such as an ultrasonic wave sensor, a collision sensor, an infrared radiation (IR) sensor and a touch sensor. The sensors detect the environmental state and receive the user commands to control the main body 100 to act correspondingly. The detected data are processed by the processing unit 110. For example, the sensors send out infrared rays and detect reflected infrared rays from obstacles to generate an obstacle detecting signal. Then, the processing unit determines whether an obstacle exists and dodges accordingly to avoid collision.

The robotic elements 124 include mechanical components, such as the moving components 104 or hands and legs of the main body 100. The robotic elements 124 include a head, a neck, hands and wheels, and the head includes a face, eyes and a nose. The processing unit 110 controls the mechanical components to move, make gestures and act body movements.

The expression display unit 126 includes a light-emitting diode (LED) array or display components to display facial expression of the main body 100.

The image capturing unit 114 may be a complementary metal oxide semiconductor (CMOS) or a charge coupled device (CCD) camera disposed at an upper part, such as the head, of the main body 100.

The wireless communication unit 116 includes a radio frequency circuit and an antenna. The wireless communication unit 116 is capable of wireless communication with the Portable device via the WLAN or blue-tooth transmission.

The broadcast unit 128 includes one or more broadcasts to play voice or music and play the contents of the digital media data.

The microphone array 130 includes multiple microphones, and the processing unit 110 can distinguish the direction of the sound according to the disposing positions of the microphones and the sound volume received by the microphones.

The battery unit 118 is a power source of the main body 100 and provides power to the components stated above. After the charge-discharge unit 120 is connected to an external charging dock 3 and the charging dock 3 is connected to the mains supply, the charge-discharge unit 120 charges the battery unit 118. The charging dock 3 can charge the main body 100 via wired and contacted charging method or electromagnetic and non-contacted charging method.

Comparing to the battery unit 118 of the main body 100, the battery unit 218 of the Portable device 2 can be set to have a higher charging priority and when the Portable device 2 is connected to the main body 100, the charge-discharge unit 120 charging the battery unit 218 first. The priority setting may be that whether the charge-discharge unit 120 gets power via the charging dock 3 or not, the charge-discharge unit 120 charges the Portable device 2 first. The charge-discharge unit 120 can charge the Portable device 2 via wired and contacted charging method or wireless and non-contacted charging method.

Figure 4:
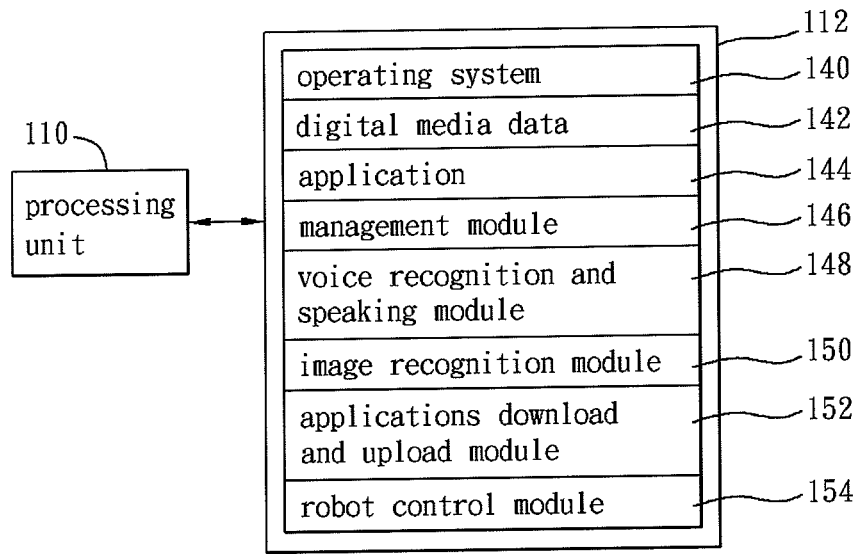
FIG. 4 is a block diagram showing a processing unit and a memory unit of the Robot in FIG. 3.

FIG. 4 is a block diagram showing the software modules stored in the memory unit 112 in FIG. 3. the memory unit 112 stores an operating system 140, a digital media data 142, at least an application 144, a management module 146, a voice recognition and speaking module 148, an image recognition module 150, a application download and upload module 152 and a robot control module 154. The processing unit 110 executes the modules to control relating software or hardware, and thus the main body 100 provides various functions.

The operating system 140 may be a Linux operating system, a Windows operating system made by the Microsoft Company or an Android operating system made by the Google Company.

The processing unit 110 processes the digital media data 142 and controls the relating hardware to play the digital media data. The processing unit 110 executes the application 144 and control the relating hardware to provide various functions, such as interacting with the user and processing images. The management module 146 manages and controls the digital media data 142 and the application 144.

The voice recognition and speaking module 148 recognizes sentences of the user, gets an appropriate response via a speaking engine, converts the response to sound via a speech synthesis system and outputs it via the broadcast unit 128. The processing unit 110 executes the voice recognition and speaking module 148 to control the broadcast unit 128 and gives out an appropriate response according the sound inputted from the microphone array 130.

The image recognition module 150 reinforces the interaction between the main body 100 and the user via a visual recognition technology, and thus the main body 100 can track and determine identity, expression, emotional response of the user and ambient objects. Inputted images can be obtained from the image capturing unit 114.

The application download and upload module 152 is connected to an online shop to update the digital media data 142 or the application 144. Moreover, the application download and upload module 152 also synchronizes the contents of the digital media data via the wireless communication unit 116 and the Portable device 2, so as to avoid out of sync of the digital media data displayed at the main body 100 and the Portable device 2.

The robot control module 154 plays expression information via the robotic elements 124 or the expression display unit 126. The robotic elements 124 can make vivid body movements to produce indications of action or intention, and the moving elements of the robotic elements 124 can make the main body 100 move and interact with the children or the old.

Furthermore, the memory unit 112 of the main body 100 stores various media data, such as videos, sounds and images. The media data can be wirelessly transmitted to the Portable device 2 via the wireless communication unit 116.

Please referring to FIG. 3 again, the Portable device 2 includes a processing unit 210, a memory unit 212, a wireless communication unit 216, an image fetch unit 214, a battery unit 218 and a charge-discharge unit 220. The media playing unit 200 includes a display unit 222 and a voice unit 224.

The processing unit 210 includes at least one processor which executes the software modules stored in the memory unit 212.

The display unit 222 may be a touch display panel or a touch screen which provides a function of display output and touch input. The digital media data can be played to the user in a form of images or visions via the display unit.

The wireless communication unit 216 includes a radio frequency circuit and an antenna connected to the main body 100 via the WLAN or the blue-tooth transmission.

The voice unit 224 includes a broadcast used as sound output, and a microphone used as sound input. The digital media data can be played via the display unit 222 and the voice unit.

The image fetch unit 214 may be a complementary metal oxide semiconductor (CMOS) or a charge coupled device (CCD) camera disposed at a front panel or a rear panel of the Portable device 2.

The battery unit 218 is a power source of the Portable device 2 and provides power to the components stated above. The charge-discharge unit 220 can be connected to a charger of the Portable device 2 and the main body 100 for charging.

The wireless communication unit 116 of the main body 100 can wirelessly communicate with the wireless communication unit 216 of the Portable device 2, and transmit the digital media data stored in the memory unit 112 of the main body 100 to the Portable device 2. The Portable device 2 reads the digital media data or the media data (such as videos, sounds and images) stored in the main body 100 via the wireless transmission between the wireless communication unit 116 and 216. After the processing unit 210 processes the fetched data, the data are played via the display unit 222 or the voice unit 224. The wireless transmission is achieved via a wireless transmission protocol, such as a blue-tooth protocol, which can easily share internal data of each node. Moreover, the Portable device 2 can also remotely control the action, moving or posture of the main body 100 via the wireless transmission between the wireless communication unit 116 and 216. When the main body 100 is connected to the Portable device 2, they can also exchange data in wired way.

Figure 5:
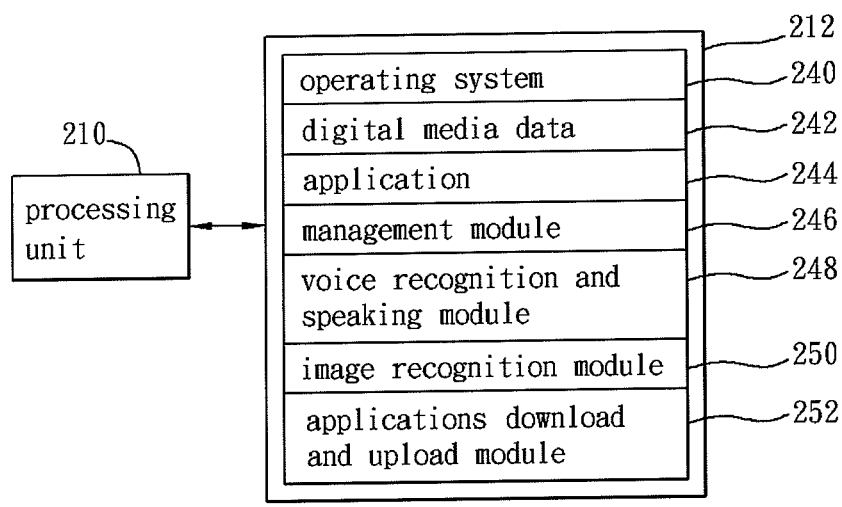
FIG. 5 is a block diagram showing a processing unit and a memory unit of the Portable device in FIG. 3.

FIG. 5 is a block diagram showing the software modules stored in the memory unit 212 in FIG. 3. the memory unit 212 stores an operating system 240, a digital media data 242, at least one application 244, a management module 246, a voice recognition and speaking module 248, an image recognition module 250 and a application download and upload module 252. The processing unit 210 executes the modules to control relating software or hardware, and thus the Portable device 2 provides various functions to broaden the interaction area between the Robot 1 and the user.

Comparing to the memory unit 112, the digital media data 142 and the application 144 stored in the memory unit 112 are mainly data or program codes, such as sounds, robotic body movement data and robotic facial expression data, which do not need to be presented via the display. The digital media data 242 and the application 244 stored in the memory unit 212 are mainly data or program codes which need to be presented via the display. The body movement data of the main body 100 and the robot control module 154 are not stored in the memory unit 212.

The main body 100 and the display unit 222 play the digital media data in different forms. The processing unit 110 processes the digital media data 142 to make the main body 100 play the digital media data in non-visual way, such as sounds, facial expressions and body movements of the robot. The processing unit 210 processes the digital media data 242 for the display unit 222 to play the digital media data in visual way.

The memory unit 212 of the Portable device 2 can further store various media data, such as videos, sounds and images. After the media data are processed, they can be played via the display unit 222 and the voice unit 224.

The Portable device 2 has a media playing function and can fetch data from the remote main body 100. The Portable device 2 can fetch data from the main body 100 or play the internal data selectively. That is, the Portable device 2 can obtain the media data or the digital media data 142 from the memory unit 212 or the memory unit 112 via the wireless communication unit 116 and 216.

The application download and upload module 252 is connected to an online shop to update the digital media data 242 or the application 244, and it can also connect to the main body 100 via wireless transmission.

The functions of the management module 246, the voice recognition and speaking module 248 and the image recognition module 250 are similar to the management module 146, the voice recognition and speaking module 148 and the image recognition module 150 of the memory unit 112, which is omitted herein.

The main body 100 and the Portable device 2 can execute the voice recognition and speaking function independently, and the Portable device 2 can also do easy image recognition. Complicated image recognition is processed by the main body 100. For example, the user holds the Portable device 2 and uses the image fetch unit 214 to take pictures, and the pictures are transmitted to the image recognition module 150 of the main body 100 for recognition via wireless transmission.

The processing unit 110 of the main body 100 may use a processor with a higher performance, and the processing unit 210 of the Portable device 2 may use a processor with lower power consumption. The processing performance of the processing unit 110 of the main body 100 is better than that of the processing unit 210 of the Portable device 2.

The memory unit 112 and the memory unit 212 may be non-volatile memories to store the software modules. The software modules are loaded from the non-volatile memories to volatile memories via the operating system 140 and 240 for the processing unit 110 and 210 to execute.

The application download and upload module 152 and 252 can synchronize the contents, states and playing progresses of the digital media data 142 and 242 via the wireless transmission, so as to avoid unsynchronized content displayed at the main body 100 and the Portable device 2. Similarly, the application download and upload module 152 and 252 can synchronize the contents, states and using progresses of the application 144 and 244.

The main body 100 and the Portable device 2 can be operated by different users. When the Portable device 2 is detached from the supporting structure 102, the main body 100 and the Portable device 2 operate independently and execute a first task and a second task, respectively, for different users. The first task is a function, such as reading, singing and interacting, which can be independently and completely processed by the main body 100. The second task is a function, such as playing media, which can be independently and completely processed by the Portable device 2. The Portable device 2 may be a mobile phone and has a communication function.

Figure 6:
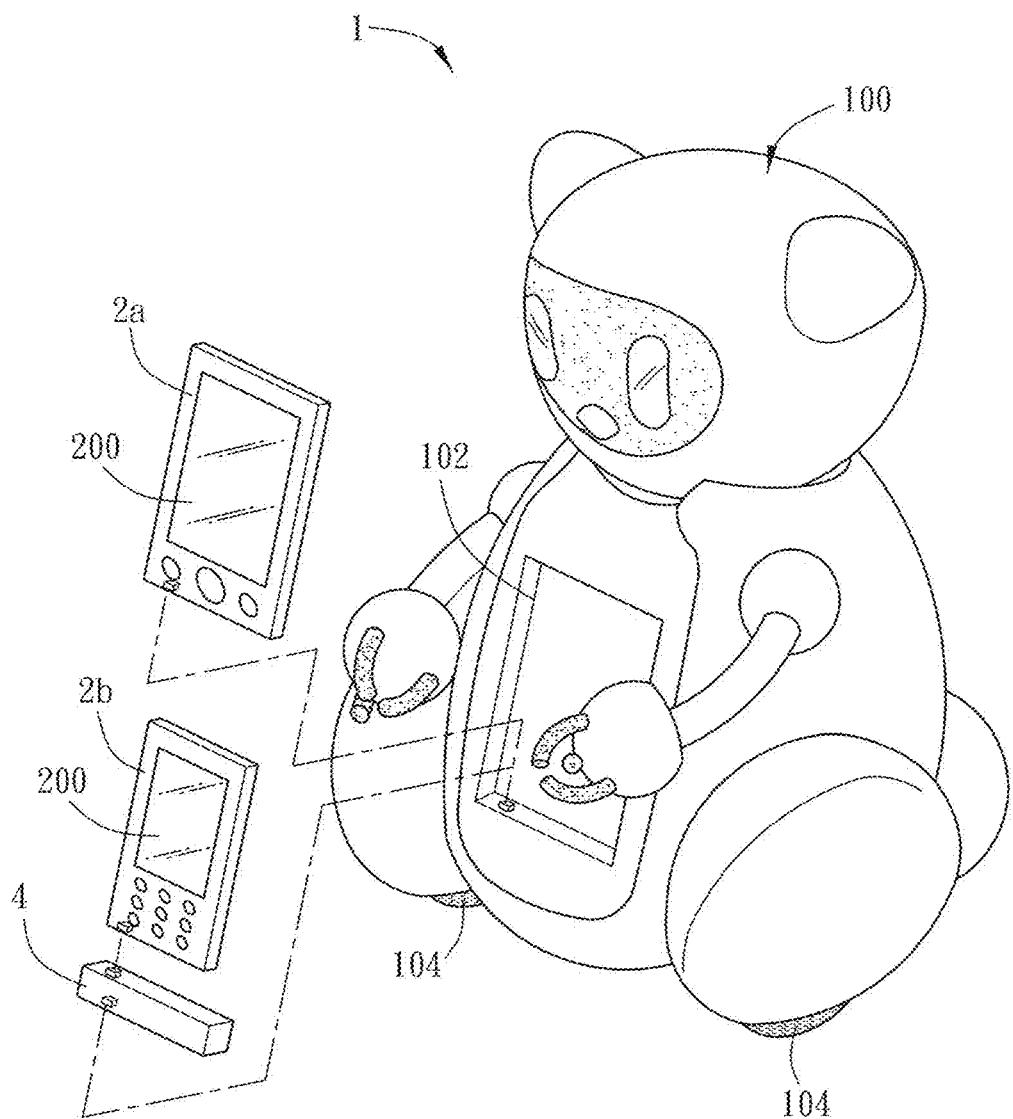
FIG. 6 is a schematic diagram showing a Robot and an adapter device in an embodiment.

As shown in FIG. 6, in order to make the Portable device 2a and 2b in different sizes placed in the supporting structure 102 of the main body 100, the Portable device 2b can be connected to an adapter device 4 first, and then be placed in the supporting structure 102. The adapter device 4 can also be placed into the supporting structure 102 first, and then the Portable device 2b is connected to the adapter device 4.

Connectors, such as a connector in universal serial bus (USB) specification, for wired charging or wired data transmission are disposed in the supporting structure 102. The adapter device 4 also includes connectors to bridge the Portable device 2b and the main body 100. The data transmission between the Portable device 2a, 2b and the main body 100 can be achieved via wireless and wired transmission.

Figure 7:
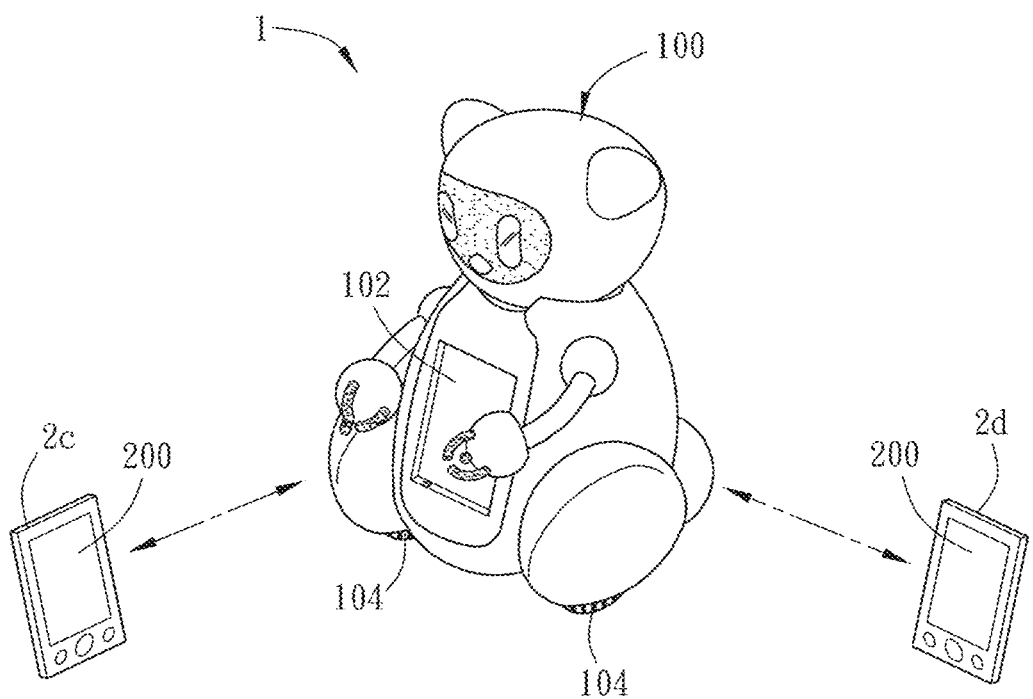
FIG. 7 is a schematic diagram showing a Robot using as a calculating center in an embodiment.

As shown in FIG. 7, the main body 100 may be used as a mobile cloud calculating center. If the calculating performance of the processing unit of the main body 100 is better than that of the processing unit of the Portable device 2c and 2d, the Portable device 2c and 2d can transmit data with a high calculating requirement to the processing unit of the main body 100 for processing. The data with a high calculating requirement may be pictures for analysis or compressed video data.

In order to reduce burdens of the Portable device, the digital media data presented via the Portable device can be first stored in the memory unit of the main body 100, transmitted to the Portable device via the wireless communication unit of the main body 100 and played in video forms via the display unit according to the received data. For example, the non-volatile memory in the memory unit of the Portable device 2c does not store the digital media data, the application, the management module, the voice recognition and speaking module and the image recognition module, and it only stores the basic operating system and the application download and upload module. The application download and upload module downloads the data or the application from the main body 100 via the wireless transmission. The downloaded data are processed and the software is executed by the processing unit of the Portable device 2c, and they are outputted via the relating output components, such as the display unit or the broadcast unit.

When the user is at home or in an office, he or she can operate the Portable device 2c and 2d to send the complicated calculation to the main body 100 for processing via the wireless transmission, and data can also be accessed from the main body 100 via the wireless transmission. The main body 100 can be used as a wireless calculation center and a wireless storage center.

The main body 100 can also be used as a resource sharing center. The internal resources of the main body 100 can be shared by multiple users. The users operate the Portable device 2c and 2d to fetch the internal resources, such as the digital media data, the media data, commercial data and game data, of the main body 100 via the wireless transmission.

The Portable device and the main body can operate at one of following modes selectively: the first mode is that when the Portable device is attached to the main body, they are combined and cooperate with each other. The second mode is that when the Portable device and the main body are separated, they can play the contents of the digital media. The third mode is that when the Portable device and the main body are separated, they operate independently to process unrelated data and provide original functions.

As stated above, the Robot can play contents of digital media. In areas where the main body cannot reach, the user can detach the Portable device from the main body to use most functions and digital contents of the main body. Consequently, the Portable device broadens the interaction area between the main body and the user, and the interaction area is not limited to the moving area of the main body. Moreover, the main body and the Portable device still keep original functions and operate independently, and the Portable device does not need to cooperate with the main body. Thus, usage of the Portable device is extended.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A Robot, comprising:
   a main body including a first battery unit and a first charge-discharge unit;
   a Portable device including a media playing unit, a second battery unit and a second charge-discharge unit; and
   a supporting structure disposed at the main body to detachably connect the Portable device;
   wherein the media playing unit plays a digital media data, and the Portable device and the main body operate independently, when the Portable device is disposed at the main body via the supporting structure, the first charge-discharge unit charges the second battery unit first.

2. The Robot according to claim 1, wherein the main body further includes a memory unit to store the digital media data.

3. The Robot according to claim 2, wherein the Portable device reads the digital media data via the memory unit of the main body.

4. The Robot according to claim 1, wherein the Portable device further includes a memory unit to store the digital media data.

5. The Robot according to claim 4, wherein the Portable device reads the digital media data via the memory unit.

6. The Robot according to claim 1, wherein the Portable device is a mobile phone, a personal digital assistant (PDA) or a PAD device.

7. The Robot according to claim 1, wherein the main body and the Portable device further include a wireless communication unit, respectively, to wireless communicate with each other.

8. The Robot according to claim 7, wherein the Portable device remotely controls the main body via the wireless communication unit.

9. The Robot according to claim 7, wherein the main body and the Portable device further include a processing unit, respectively, to process the digital media data.

10. The Robot according to claim 1, wherein the media playing unit includes a touch screen.

* * * * *